(12) United States Patent
Green et al.

(10) Patent No.: US 9,548,797 B1
(45) Date of Patent: Jan. 17, 2017

(54) LIGHTING UNIT WITH NEAR FIELD COMMUNICATION, INTEGRATED CIRCUIT AND METHODS THEREFOR

(71) Applicant: Telensa Limited, Great Chesterford, Essex (GB)

(72) Inventors: Jonathan Simon Green, Cambridge (GB); Philip Alan Bowden, Great Chesterford (GB); Adam Sutton, Cambridge (GB)

(73) Assignee: Telensa Limited, Great Chesterford (GB)

( * ) Notice: Subject to any disclaimer, the term of this patent is extended or adjusted under 35 U.S.C. 154(b) by 0 days.

(21) Appl. No.: 15/044,341

(22) Filed: Feb. 16, 2016

(51) Int. Cl.
| | |
|---|---|
| H05B 37/02 | (2006.01) |
| H05B 33/08 | (2006.01) |
| H04B 5/00 | (2006.01) |
| F21S 8/08 | (2006.01) |

(52) U.S. Cl.
CPC ............ *H04B 5/0031* (2013.01); *F21S 8/085* (2013.01); *H05B 33/0845* (2013.01); *H05B 37/0272* (2013.01)

(58) Field of Classification Search
CPC .... H04W 4/008; H04W 52/028; H04W 84/12; H04W 88/16; H04B 5/0062; H04B 5/0056; H04B 1/38; H04B 5/0081; H04B 5/02; H04B 37/0272; H04B 37/0245; H04B 37/02; H04B 37/032; Y02B 60/50; Y02B 20/72; G06K 7/10237; G06K 7/10336; G06K 7/10356; H05B 37/02; H05B 37/03; H05B 33/0815; H05B 33/0851; H05B 37/04; H05B 41/28; H05B 41/2828; H05B 41/3921; H05B 41/3927

See application file for complete search history.

(56) References Cited

U.S. PATENT DOCUMENTS

| | | | | |
|---|---|---|---|---|
| 2012/0286770 | A1* | 11/2012 | Schroder | H05B 37/0272 324/113 |
| 2014/0215029 | A1 | 7/2014 | Terwilliger et al. | |
| 2014/0354188 | A1* | 12/2014 | Takahashi | H05B 37/0245 315/312 |
| 2015/0061541 | A1* | 3/2015 | Gandini | A01K 63/06 315/294 |
| 2015/0296598 | A1* | 10/2015 | Haid | H05B 37/0272 315/291 |
| 2016/0165702 | A1* | 6/2016 | Lai | H05B 33/0845 315/201 |

FOREIGN PATENT DOCUMENTS

KR 20130098569 9/2013

* cited by examiner

*Primary Examiner* — Vibol Tan
(74) *Attorney, Agent, or Firm* — Optimus Patents US, LLC

(57) ABSTRACT

A lighting unit is described comprising: a microcontroller; and a near field communication (NFC)-enabled embedded device comprising NFC shared memory configured to be written to by both an external NFC reader/writer using near field communication and the microcontroller and configured to enable an operation of the lighting unit to be both monitored and controlled using NFC. In this manner, the operation of a lighting unit may be monitored using NFC and controlled by using one of two approaches, such as via a microcontroller within the lighting unit and/or a near field communication, NFC, via the NFC-enabled embedded device.

19 Claims, 4 Drawing Sheets

FIG. 1 - Prior Art

LIGHTING UNIT WITH NEAR FIELD COMMUNICATION, INTEGRATED CIRCUIT AND METHODS THEREFOR

FIELD OF THE INVENTION

The field of this invention relates to lighting units, integrated circuits, and methods for Near Field Communication for lighting units.

BACKGROUND OF THE INVENTION

Near Field Communication (NFC) is a set of protocols that enable, for example, smartphones and other devices to establish radio communications with each other by either touching the devices together, or bringing them into a sufficiently close proximity, say to a distance of typically 10 cm or less. NFC requires close proximity between transmitting/receiving elements, and as such is not an appropriate technology for control of the devices during their normal operation. Hence, NFC has been developed for, and used primarily in, applications such as reading identifiers (IDs) of devices with or without power, and electronic payments, e.g. contactless payment cards.

NFC always involves an initiator device and a target device; the initiator device actively generates a radio frequency (RF) field that can optionally power a passive target device. This enables NFC target devices to take very simple form factors, such as tags, stickers, key fobs, or cards that do not require relatively large power supplies. NFC peer-to-peer communication is possible, provided both devices are powered.

Thus, in order to support near field communications, NFC devices fall into two main areas: NFC tags and NFC readers/writers. NFC tags often securely store personal contacts, such as debit and credit card information, loyalty program data, PINs, and networking contacts, among other information; they may also be able to execute cryptographic functions. NFC tags contain data and are typically read-only, but in a few instances may be re-writable. NFC tags can be configured in accordance with specifications provided by a relevant industry association; they can also be custom-encoded by their manufacturers with data and/or alternative/additional functionality.

NFC readers/writers are typically NFC-enabled devices configured to read information stored on inexpensive NFC tags embedded in, say, credit cards, labels or smart posters. Both NFC tags and NFC readers/writers are known to have interchangeable functionality and similar (or the same) components and circuits. As such, an NFC device may often function as either a NFC tag or a NFC reader/writer.

FIG. 1 illustrates a known block diagram of a NFC link showing both an uplink communication path 100 and a downlink communication path 150 and the types of signals encountered. In the first uplink communication path 100 load (amplitude) modulation 122, 124 is employed by the NFC devices. A NFC reader 104 instigates a sinusoidal waveform 110 into a radiated field 106. A tag 102 varies the impedance it presents to the radiated field 106 by switching ON/OFF a resistor/capacitor (load) 108. In this manner, binary data is encoded onto the sinusoidal waveform 110 by the effect of the impedance variation, which results in modulation of the sinusoidal waveform 120, which is detected by the NFC reader 104.

In the first downlink communication path 150, waveform modulation is employed. A NFC reader 154 instigates a sinusoidal waveform 172 into a radiated field 156 to be received by a tag 152. The data to be passed on the downlink is directly mixed with a carrier, or multiplied with a sub-carrier before mixing with the carrier. In this manner, encoded binary data may be recovered by the tag 152.

KR20130098569 describes a concept of using NFC communications for a grid of streetlights where NFC is used as a one-way control mechanism to turn off individual streetlights in the grid manually using an ID of the individual streetlight.

However, the inventors of the present invention have identified a number of problems in the technical field of streetlighting, which may be solved or alleviated by introducing NFC technology to the streetlighting unit. For example, providing a connector on the streetlighting unit casework, in order to communicate with the components contained therein, may impact its weatherproofing properties. Such connectors may be needed to provide data access, when the streetlighting unit or components contained therein, may be either powered-up (working) or not powered-up. Furthermore, removing the streetlighting unit casework in order to gain access to an internal connector or component could impact waterproofing and perhaps risk damaging the streetlighting unit in the longer-term. Indeed, any mechanical or electronic interaction at the top of a lamppost to the streetlighting unit carries potential risk. Opening the streetlighting unit casework, in situ, will also expose the technician to mains voltages, with attendant risks. It is known in the field of streetlighting units that over-the-air (OTA) communications to the streetlighting unit may exist, i.e. main long-range wireless radio link. However, in some instances, such a main long-range wireless radio link may not be available or may be faulty.

US2014215029 describes a concept of NFC communications in an information handling system. The concepts described in US2014215029 are limited to use of NFC in the programming of specific information-handling devices based on their identifiers (IDs). US2014215029 describes a mechanism whereby a first NFC communication link is used to retrieve an ID of a device and then configuration information is applied to the device using a second NFC communication link.

Thus, the inventors of the present invention believe that there are a number of new applications for NFC technology, as well as a general need for improved concepts on current NFC techniques.

SUMMARY OF THE INVENTION

Accordingly, the invention seeks to mitigate, alleviate or eliminate one or more of the above mentioned disadvantages, either singly or in any combination. Aspects of the invention provide a wireless communication unit, an integrated circuit and a method therefore, as described in the appended claims.

According to a first aspect of the invention, there is described a lighting unit comprising: a microcontroller; and a near field communication, NFC, -enabled embedded device comprising NFC shared memory configured to be written to by both an external NFC reader/writer using near field communication and the microcontroller to control an operation of the lighting unit.

In this manner, an operation of a lighting unit may be controlled by two approaches, such as via a microcontroller within the lighting unit and a near field communication, NFC, via a NFC-enabled embedded device. Furthermore, bi-directional NFC communication is provided to the shared memory NFC. For example, the NFC shared memory may be both accessed and programmed by a single device, for example the external NFC reader/writer, in contrast to the system in US2014215029 that describes uploading data via NFC and the results of a remote testing operation being returned by an alternative primary communication channel, as well as the one-way NFC lighting switch-off operation as disclosed in KR20130098569.

According to an optional example, the lighting unit may be included in a low power wide area network of lighting units coupled to a central management system. According to an optional example, the lighting unit may be an external streetlighting unit. According to an optional example, the external streetlighting unit may be one from a group of substantially identical streetlighting units identified by a version identifier of the lighting unit and without an individual unit identifier. In this manner, the operation of a plurality of substantially identical streetlighting units can be controlled in the same way, primarily by the lighting unit microcontroller and thereafter by an NFC-enabled embedded device within the lighting unit configured to use NFC technology.

According to an optional example, the NFC-enabled embedded device may be configured to: detect a presence of the external NFC reader/writer, and, in response thereto, provide a presence indication signal to the microcontroller; wherein in response to a receipt of the presence indication signal the microcontroller is inhibited from writing to the shared NFC memory.

According to an optional example, the microcontroller may be inhibited from writing to the shared NFC memory for a period of time until the presence indication signal is removed or replaced.

According to an optional example, in response to a detection of a presence of the external NFC reader/writer the microcontroller may be further configured to turn on power to the NFC-enabled embedded device.

According to an optional example, the microcontroller may be further configured to store operational data for the lighting unit in the shared NFC memory, configured to be accessible by the external NFC reader/writer. According to an optional example, in response to the stored operational data being accessed by the external NFC reader/writer, the shared NFC memory may be configured to receive and store correction software provided by the external NFC reader/writer. According to an optional example, in response to correction software being provided by the external NFC reader/writer the microcontroller may be configured to re-program an operation of the lighting unit. In this manner, the lighting unit may be configured such that an external NFC reader/writer may be able to access operational data of the lighting unit and, if needed, use NFC technology to write to the microcontroller and re-program lighting unit, for example to implement bug fixes.

According to an optional example, the NFC-enabled embedded device may be configured to detect a presence of the external NFC reader/writer and provide a presence indication signal to the microcontroller, and in response to correction software being provided by the external NFC reader/writer the microcontroller may be configured to re-program an operation of the lighting unit. In some examples, correction software may encompass data, such as, perhaps a timer value needs to be changed, or a frequency setting etc.

According to an optional example, the microcontroller is configured to receive a notification that correction software has been uploaded to the shared NFC memory and access the correction software to perform at least one of the following: (i) correct a fault identified on the lighting unit based on the accessed operational data; and (ii) update software on the lighting unit based on a software version employed by the microcontroller for operating the lighting unit.

According to an optional example, the microcontroller may comprise or be coupled to a metering circuit configured to measure power usage for the lighting unit, for example multiple times over several power readings, and store the measured power usage in the shared NFC memory. According to an optional example, the stored power usage for the lighting unit may be accessible by the external NFC reader/writer for use in at least one from a group of: a billing system, and/or in testing and/or calibration of the metering function. This is in contrast to known streetlighting power usage measurements that are returned to the main control system over the main radio interface. Advantageously, the use of NFC to access the same data, say during a test of the controller (and/or the metering function) in order to verify correct operation of the billing system is able to provide an alternative and/or more reliable technique to obtain this data.

According to an optional example, the lighting unit may further comprise a location determination module operably coupled to the NFC shared memory, wherein the NFC shared memory is configured to store at least: an identifier of the lighting unit and a location of the lighting unit extracted from the location determination module, such that the at least one remote NFC reader/writer is capable to harvest the identifier and location of each of a plurality of lighting units using an NFC communication link and upload to a microcontroller of the system to build a geographical map of the plurality of lighting units.

According to an optional example, the microcontroller may be configured to manage a communication protocol to facilitate communications between NFC-enabled devices comprising at least one of the following: messages carry address information, enable subsequent forwarding of a message to an indicated destination address, messages provide an indication of an origin address, enable a message to transit more than one NFC-based connection perform, NFC error-detection, NFC error-correction, a message validity check.

According to a second aspect of the invention, an integrated circuit for a lighting unit comprises: a microcontroller; and a near field communication, NFC, -enabled embedded device comprising NFC shared memory configured to be written to by both an external NFC reader/writer using near field communication and the microcontroller to control an operation of the lighting unit according to the first aspect.

According to a third aspect of the invention, a method is described for controlling an operation of a lighting unit that comprises a microcontroller; and a near field communication, NFC, -enabled embedded device comprising NFC shared memory. The method comprises: configuring the NFC shared memory to be written to by both the microcontroller and an external NFC reader/writer using near field communication; writing operational data of the lighting unit to the NFC shared memory by the microcontroller; reading the operational data of the lighting unit from the NFC shared memory by the external NFC reader/writer using near field communication; writing correction software to the NFC shared memory by the external NFC reader/writer based on data read from the NFC shared memory; and controlling an operation of the lighting unit by the microcontroller based on the correction software written to the NFC shared memory.

According to a fourth aspect of the invention, a near field communication, NFC, system comprising an external near field communication, NFC, reader/writer; a lighting unit comprising: a microcontroller; and a NFC-enabled embedded device comprising NFC shared memory configured to be written to by both the external NFC reader/writer and the microcontroller to control an operation of the lighting unit.

According to an optional example, where the lighting unit is an external streetlighting unit, the external streetlighting unit may be one from a group of substantially identical streetlighting units identified by a version identifier of the lighting unit and without an individual unit identifier.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIGs are illustrated for simplicity and clarity and have not necessarily been drawn to scale.

DETAILED DESCRIPTION

Figure 1:
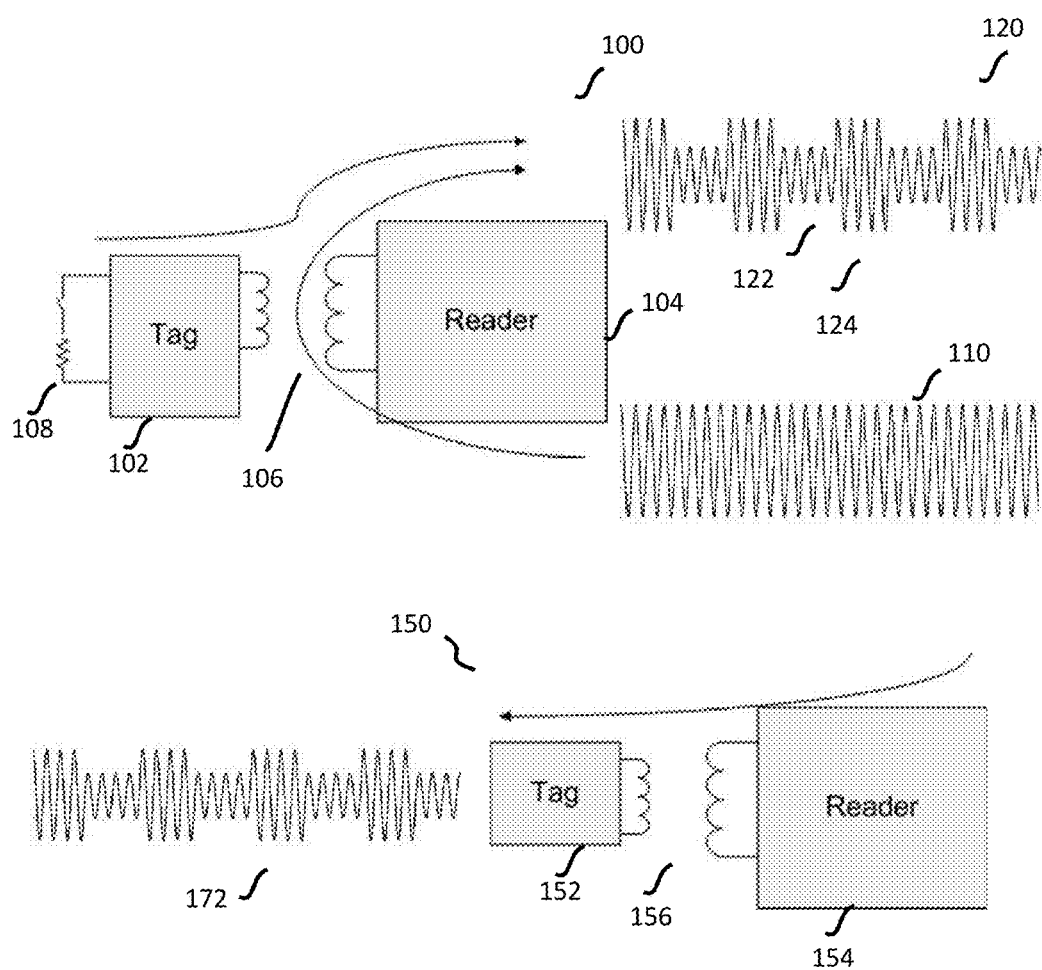
FIG. 1 illustrates a prior art block diagram of a NFC uplink and downlink communication link.

Although examples of the invention are described with reference to a near field communication (NFC) link and a corresponding lighting unit that comprises NFC-enabled embedded devices, with integrated circuits and methods of fault detection and correction of lighting units, such as streetlighting units, it is envisaged that the concepts described herein may be embodied in any scenario or system where NFC technology may be used. For example, it is envisaged that the concepts described herein can alternatively be applied to street parking systems. In other examples, it is envisaged that the concepts described herein can be applied to other smart city applications such as gully monitoring, bin collection, hardware equipment asset monitoring or mobile vehicle tracking, etc. In other examples, it is envisaged that the concepts described herein can be applied to home automation, such as security system management, domestic lighting control or services monitoring, etc. In other examples, it is envisaged that the concepts described herein can be applied to metering applications, such as metering of streetlighting units. As such, the described embodiments of a near field communication link for lighting units is only one such envisaged application for the concepts described herein.

In some examples, it is envisaged that the concepts described herein can be applied to identifying faults in streetlighting units using NFC, and in further examples correcting those faults again using NFC. The term 'correction software' is used hereafter to encompass all software to improve a performance of the electronic device, such as a faulty streetlighting unit, that comprises an NFC-enabled embedded device amongst other entities, and would benefit from upgrades, bug fixes, etc. In some examples, the NFC-enabled embedded device may be installed (i.e. in operational situ) when accessed via NFC, or separately removable to be accessed via NFC.

In some examples of the invention, NFC-enabled embedded devices may encompass any NFC semiconductor device or subsystem within an electronic unit, e.g. a lighting unit or streetlighting unit, that has inbuilt NFC memory, and whose NFC memory can be read by or written to an external NFC reader/writer. In some examples of the invention, such an external NFC reader/writer may encompass any external unit (for example a 'wand', a mobile phone or similar device) that actively powers the NFC-enabled embedded device through induction, and reads from and writes to the NFC memory using the same inductive method. Thus, in some examples of the invention, the external NFC reader/writer may be able to communicate with the NFC-enabled embedded device via the NFC-enabled embedded device's NFC memory.

In some examples of the invention, the NFC-enabled embedded device may be configured to support a local wireless connection to the light in order to upload data into the lighting unit, e.g. a streetlighting unit, or retrieve data from the lighting unit. For example, if a light is to be installed before the geographical area is covered by a radio network that would be configured normally to control the streetlight operation, then the NFC capability of the streetlighting unit can be used to access a microcontroller or microprocessor in the streetlighting unit to configure it. Alternatively, or additionally, in some examples, if a streetlighting unit stops working and doesn't respond to the radio network, NFC may be used to obtain data from the streetlighting unit about its operational status, software version(s) that it uses, performance data, etc.

Examples of the invention are described with regard to controlling one or more operation of a lighting unit, such as a streetlighting unit. In this context, for example, operations of a lighting unit that may be controlled include, but are not limited to, writing to a memory in the lighting unit, reading data from a lighting unit, testing one or more components or circuits in the lighting unit, calibrating one or more components or circuits in the lighting unit, updating the software or one or more components or circuits in the lighting unit, identifying and/or correcting a fault in one or more components or circuits in the lighting unit, measuring a performance of one or more components or circuits in the lighting unit such as a typical power usage, etc.

Some examples of the invention provide an NFC enabled device embedded in a streetlighting unit that is configured to have a metering circuit and function, to measure power delivered to the light. Thus, in some examples, the streetlighting unit may comprise the lamp, any associated control circuit, a microprocessor, a metering circuit and the embedded NFC-enabled device. In some examples, the data from the metering circuit and function may be used for charging/billing purposes. As a consequence, due to the importance of obtaining accurate meter readings, the NFC enabled device may be tested for accuracy in design verification/approval and/or during production, and in some examples in the field using the herein described NFC bidirectional communication techniques.

Some examples of the invention encompass the NFC-enabled embedded device being written to, or read from, by the external NFC reader/writer using near field communication, either in situ when connected to the lighting unit (e.g. streetlighting unit) or when removed and separate from the lighting unit.

Furthermore, because the illustrated examples of the present invention may for the most part, be implemented using electronic components and circuits known to those skilled in the art, details will not be explained in any greater extent than that considered necessary as illustrated below, for the understanding and appreciation of the underlying concepts of the present invention and in order not to confuse or distract from the teachings of the present invention.

Figure 2:
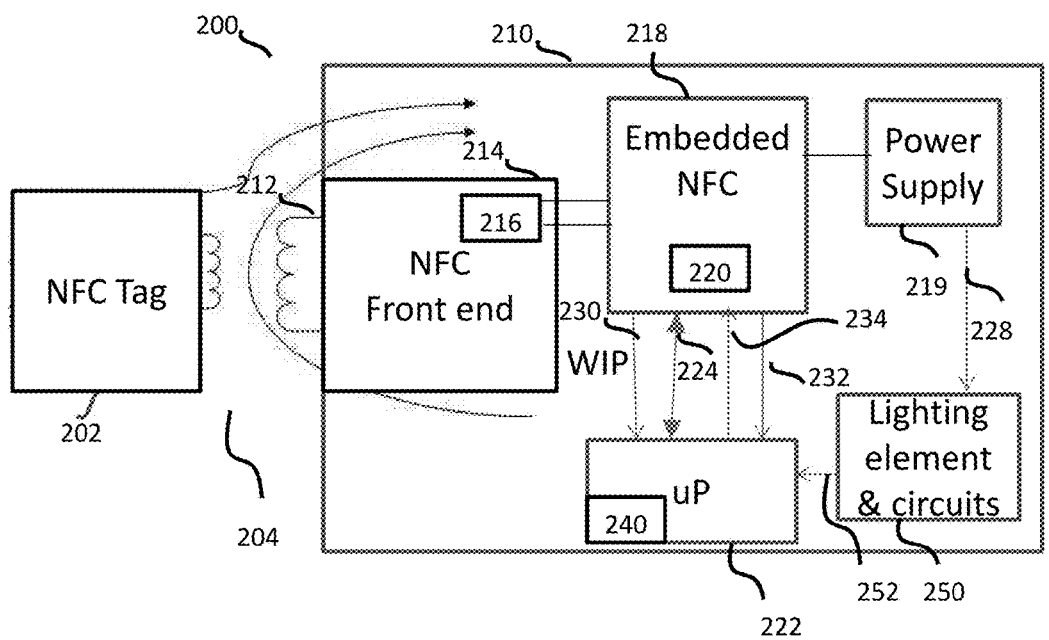
FIG. 2 illustrates a lighting unit comprising a NFC-enabled embedded device capable of NFC communications according to a first example embodiment of the present invention.

Referring to FIG. 2, there is illustrated an example of a simplified block diagram 200 of part of an NFC-capable electronic device, which in this example is a lighting unit 210 configured with NFC capability and circuitry, adapted to support the inventive concepts of an example of the present invention. NFC-capable electronic devices, in the context of the illustrated example of the invention, include NFC reader circuits and/or tags 202, which terms may be deemed interchangeable. In the context of the present invention, the tag 202 may be an NFC capable installation tool that is placed in the vicinity of the lighting unit 210. In some examples, the NFC-capable electronic device may be an Internet of Things sensor/actuator. In some examples, the NFC-capable electronic device may be additionally capable of bi-directional communication, by wireless or wireline means, with a network. In some examples, the NFC-capable electronic device may be a stand-alone device without any additional communication capability. In some examples, the NFC-capable electronic device may only be additionally capable of unidirectional communication to/from a network.

In some examples, the tag 202 is used to access and read data from (or sometimes write data to) a memory in the lighting unit 210.

Again, in an uplink communication path, load modulation is employed, whereby the lighting unit 210 with NFC capability instigates a sinusoidal waveform into a radiated field 204, which is looped back to the lighting unit 210. In the example block diagram, the tag 202 varies the impedance in the radiated field 204, for example by switching 'ON'/'OFF' a resistor/capacitor load (not shown). In this manner, binary data is encoded as impedance variation, and results in modulation of the sinusoidal waveform being returned to the lighting unit 210 with NFC capability from the tag 202. In this example, the lighting unit 210 with NFC capability comprises a NFC antenna 212, for example in a form of an antenna coil, and reader front end circuit 214 that is arranged to capture the returned modulated sinusoidal waveform. In some examples, reader front end circuit 214 may comprise a transceiver unit 216. The reader front end circuit 214 or transceiver unit 216 comprises at least a down-conversion mixer to output an analogue modulated signal. In some examples, reader front end circuit 212 or transceiver unit 216 may also comprise an analog-to-digital converter to convert the returned modulated sinusoidal waveform and output a digital signal.

In some examples, the reader front end circuit 214 or transceiver unit 216 is operably coupled to an embedded NFC integrated circuit (IC or chip) 218 comprising memory 220, such as non-volatile memory. In this example, the lighting unit 210 with NFC capability further comprises a microcontroller 222 (or microprocessor) operably coupled to the embedded NFC IC 218 and configured to communicate with the memory 220.

In the context of the present invention, memory 220 acts as a conduit of data between the microcontroller 222 (or microprocessor or equivalent in other examples) in the lighting unit 210, which, for example, may log errors encountered in operation and put those reports in the shared memory, from whence they can be read by the NFC device/tag 202 using NFC. Both the tag 202 (which in some examples may be an installation tool) and the microcontroller 222 (or microprocessor) are capable of reading from and writing to the memory 220 in the embedded NFC IC 218.

In some examples, there is a two way messaging protocol between the microprocessor or microcontroller 222 and the tag 202 or NFC installation tool, with active communication links with the NFC shared memory 220 on the NFC device being shared between the microcontroller 222 (or microprocessor) and the tag 202 or NFC installation tool. In one example, a presence of the external NFC reader/writer may be detected, and in response thereto, at least one presence indication signal, such as a write-in-progress (WIP) signal 230 and a power indication output (e.g. Vout) 232, may be provided to the microcontroller 222 (or microprocessor) from the embedded NFC IC 218. In other examples, it is envisaged that other mechanisms may be used to prevent both entities/ends concurrently writing to the NFC shared memory 220. In some examples, in order to prevent reading partially written messages, a status byte may be used to indicate complete messages. As illustrated, a serial data and clock signal 224 provides a data communication link between the NFC IC 218 and the microcontroller 222 (or microprocessor). In some examples, the NFC IC 218 can either be powered from the device power supply 219, for example controllable by the microcontroller 222 (or microprocessor) or by the microcontroller 222 (or microprocessor) providing a Vcc source voltage 234, or from energy-harvesting the NFC signal.

In some examples, a protocol may be employed to allow shared memory communication between the microcontroller 222 (or microprocessor) in the lighting unit 210 and the external NFC device (such as the installation tool or tag 202). In some such examples, the protocol may be managed by the microcontroller 222 (or microprocessor). In some examples, the protocol may enable messages communicated between the NFC-enabled devices to carry addressing information, enabling subsequent forwarding of a message to its indicated destination address, as well as providing an indication of its origin address. Such a protocol may enable messages to transit more than one connection, including NFC-based connections.

In one example, separate shared memory areas may be assigned for inbound and outbound messages and each memory area may hold one or more messages, and may also hold addressing information and flags associated with that message. Inbound messages are those written by the external NFC device into the inbound message area and outbound messages are those written into the outbound message area by the microcontroller 222 (or microprocessor).

In some examples NFC-based error-detection or NFC-based error-correction coding may be employed to protect against the impact of errors being introduced in the communication. Other protocol mechanisms (for example acknowledgements, such as automatic repeat requests (ARQs)) may be used to correct for detected message errors.

When writing a message into a memory field in NFC shared memory 220, a flag may first be set to indicate that the message is not valid. Thereafter, for example, the header and message may be written, followed by, say, a four-byte cyclic redundancy check (CRC) value, and possibly other flags. When all data related to the message has been written, the flag may be reset to indicate that the message is valid. This mechanism, or a similar mechanism, may prevent an incomplete message being read from the memory.

The microcontroller 222 may be notified by control signal as soon as any data (which may be an inbound message) may have been written to the microcontroller 222 NFC shared memory 220 by external NFC device or tag 202, possibly before NFC writing is complete. Equally, in some examples, it is envisaged that it may take time to complete the write of the NFC shared memory 220 by the microcontroller 222. When a message is read from the shared memory by an external NFC device or tag 202 (or the microcontroller 222), the related memory contents (including any flags) may be analysed to determine whether the message writing is complete and the message itself is a new and valid message. After reading, the memory contents shall be changed to indicate that the message has been read.

In some examples of the invention, an NFC installation tool, such as tag 202, may be used to program or extract the lighting unit identifier (ID), date of manufacture, hardware and software version product options and other status or configuration information, such as time of day, date or location, and details of the state of the interface to the lighting unit 210 to/from the lighting unit 210 using NFC. In some examples of the invention an NFC installation tool, such as tag 202, may be used to program data into the lighting unit 210, either in situ or during installation, to determine the functioning and operation (e.g. control or dimming, etc.) of the lighting unit 210. For example, the programming may determine when and under what circumstances lighting operations shall take place, or specify the type of interface (e.g. analogue or digital) required to access the lighting unit 210, including when no radio link is operational to program data to define such function and operation, such as when system installation is not yet complete. In some examples, this NFC communication can also be used to configure and report on device testing and calibration. In some examples, NFC may be used to program the identified data into or extract it from the NFC-enabled embedded device.

In some examples of the invention, NFC communication may be used in fault diagnosis of the lighting unit 210, either in the field or following a return of the lighting unit 220 to a testing facility. In this example, bringing the tag 202 close to the lighting unit 210, the tag 202 or memory 220 may be configured to provide a status of the lighting unit 210. In some examples, this data may be either read direct from NFC shared memory 220, or requested to be transferred via shared memory 220 from elsewhere in the device in other example architectures. In some examples, parameters of lighting unit 210 that may be read include one or more of the following: a number of mains brown-outs; a time of a last power up/down, other event log contents, etc.

In some examples of the invention, the lighting unit 210 with NFC capability may be configured to include a metering circuit 240 and/or logic or software functionality, for example located in (or coupled to in other examples) microcontroller 222 (or microprocessor). The metering circuit 240 and/or logic or software functionality may be configured to measure power delivered, for example at the point at which mains comes into the lighting unit 210, or say to the light 250 from the mains or from a power supply 219. In some examples, this information may be returned over the NFC interface. This is in contrast to a known and typical power usage measuring operation, which is returned to the main control system over the main radio interface. Furthermore, in some examples, it is envisaged that the NFC interface may be used to access the same data during a testing operation performed on the controller (and the metering function) in order to verify correct operation of the billing system. As a consequence, due to the importance of obtaining accurate meter readings, the metering circuit 240 and/or logic or software functionality of the lighting unit 210 may be tested for accuracy in design verification/approval and/or during production, and in some examples in the field using the herein described NFC bidirectional communication techniques.

In some examples, the lighting unit may comprise a location determination module operably coupled to the NFC shared memory, wherein the NFC shared memory is configured to store at least: an identifier of the lighting unit; and a location of the lighting unit extracted from the location determination module, such that the at least one remote NFC reader/writer is capable to harvest the identifier and location of the lighting unit using an NFC communication link and upload to a microcontroller of a system to build a geographical map of a plurality of lighting units.

Such a metering application for lighting units that uses NFC is a substantial movement away from current remote metering techniques that use an optical communications port (e.g. flashing light emitting diodes (LEDs)) to co-ordinate any testing between the test equipment and the meter. However, as recognised by the inventors of the present invention, an optical communications approach suffers from a cost of adding a transparent window in the housing; the potential unreliability of a window in the housing (joints in materials); the need to physically align the internal LED and the external device; and the need to ensure the window is clean before use. Alternatively, lights with metering functions are known to be 'smart' and connected to a controller by a primary long-range wireless or wired communication link. Thus, in accordance with some examples and adopting an NFC communication link approach to obtaining metering data for test and calibration purposes as described above, no window is needed, thereby avoiding cost and unreliability issues; no precise alignment is needed, and there is no requirement to clean a window before use.

In this manner, no window is needed in the lighting unit to communicate a power usage reading, or precise alignment of the window. Furthermore, such an NFC approach avoids the cost and unreliability issues associated with current long-range radio meter reporting techniques.

In some examples of the invention, the NFC installation tool, such as tag 202, may be employed in the process of installing a series of streetlighting units, or in the process of installing NFC-enabled embedded units into streetlights, at pre-defined locations. In this example, an installation engineer is able to match the streetlighting unit ID and read from it via NFC, with a predefined location at the time of installation. Such streetlighting units are typically located in awkward places to physically access, such as a top of a lamp post. In some examples, the NFC installation tool, such as tag 202, may be placed near the installed streetlighting unit (or the NFC-enabled embedded device), with NFC being used to request one or more of the following items of information:

(i) An identifier (ID) of the streetlighting unit;

(ii) A location of the streetlighting unit (where the location information may be provided if the streetlighting unit has a built-in means of assessing location, such as GPS);

(iii) A power supply status of the streetlighting unit, for example to indicate whether (or not) any fault may be due to a power supply failure, either internal power or mains voltage;

(iv) A software version of the streetlighting unit, (v) A hardware model of the streetlighting unit; and (vi) One or more streetlighting unit configuration options.

In this manner, using NFC communication to interact with a streetlighting unit may provide one or more of the following benefits: data transfer is effected automatically when the NFC installation tool such as tag 202 is located near the lighting unit 210, it may provide a reliable mechanism to provide firmware or software updates to the lighting unit, it may avoid a need for an installation engineer to remove the streetlighting casework, it may avoid a need to put in a wired connection to the lighting unit, say via an interface/input port in order to attach a remote programming unit to (as such ports are costly, potentially unreliable and difficult and dangerous to access e.g. via a cherry picker, say in inclement weather).

In some examples of the present invention, the NFC shared memory may be coupled to a location determination module in the lighting unit. The NFC shared memory may be configured to store at least: an identifier of the lighting unit; and a location of the lighting unit extracted from the location determination module. In this manner, at least one remote NFC reader/writer may be capable to harvest the identifier and location of the lighting unit for analysis purposes. Furthermore, by accessing such information using an NFC communication link, the NFC reader/writer may subsequently upload the location and identifier data to a microcontroller of the streetlighting system, for example for the system to build a geographical map of a plurality of lighting units and their operational status.

In the context of the present invention, the 'automatic' transfer of data when the NFC installation tool such as tag 202 is located near the lighting unit 210 may encompass a high-level protocol that is inherent in NFC, which provides a means for data transfer between the lighting unit 210 and the NFC installation tool, and which establishes a connection to permit this when the two are brought together. In some examples, a protocol may also be implemented in the lighting unit 210 and the NFC installation tool that uses that NFC connection for maintenance/installation functions. In some examples, handshaking may be employed in some or all data transfers, and may be inherent in the overall process, and may not be visible to the user or maintenance engineer. Although in some examples an automatic transfer of data may be effected when the NFC installation tool is located near the lighting unit 210, a manual transfer of data may be effected in other examples, for example following an activation of one or both of the lighting unit 210 and the NFC installation tool.

An example of such a higher-layer protocol may introduce one or more capabilities, such as addressing, routing and forwarding, enabling messages to be passed from an originator to an immediate recipient and forward (if indicated in addressing information in the message) to a destination recipient C (potentially with further forwarding). Such a protocol may offer additional features, such as acknowledgement of messages. Notably in accordance with examples of the present invention, such protocol is implemented in NFC over an NFC bearer.

A further benefit of using NFC to program or extract data from the NFC shared memory, is that the data can be programmed or extracted without a need for the lighting unit to be switched off or disconnected from a power supply (such as the voltage mains) or any other communication means, e.g. a cellular or wired communication link to a central management system.

In some examples of the invention, the NFC shared memory can be read from and written to whilst the lighting unit is not connected to a power supply, for example due to 'energy harvesting'. With an energy harvesting implementation, interaction with the shared NFC memory of the lighting unit is achieved using inductive power from the external NFC reader/writer. In one example, a delayed communication may be achieved by placing a message to be sent to the lighting unit within the NFC memory, and its reply (if any) from the microcontroller may be collected later, for example after the lighting unit has been powered at some point. In another example, such an energy harvesting implementation may yield enough energy to enable the NFC-enabled embedded device to be fully or partially powered and thereby to make a reply with or without delay without the lighting unit being thus powered. In some examples, the lighting unit may not even need to be powered whilst the reply is being read. One example of this may be in a streetlighting unit application, whereby a power supply may be isolated from the streetlighting unit in daylight hours, for example in response to a light meter, and advantageously data can still be collected from and messages sent to the lighting unit when no power is supplied to the unit. Similarly, an 'energy harvesting' approach may be employed during manufacturing to program the lighting unit or extract data therefrom.

Advantageously, for example in applications where a series of similar devices do not need to be complex and identified by individual unique identifiers, such as lighting units, short range NFC communication enables it to be determined unambiguously which device is being communicated with, unlike primary over-the-air (OTA) communication, which can communicate over a longer distance and, which, therefore needs to resolve the device (e.g. lighting unit) ID and/or location information in order to determine with which light it is communicating.

Alternatively, in other examples, when the lighting unit may be identified by a unique identifier, the provision of a shared NFC memory and the provision of NFC capability may allow, say, rapid access to the lighting unit serial number. In this manner, paper labels and bar codes, etc., which are often illegible after a few years at the top of, say, a lamppost, can still be readily accessed and discerned.

In some examples, following the identification of one or more suspected faulty lighting unit using NFC communication, it is much simpler to implement a 'returns' process of (suspected) faulty lighting units. In such examples, it is possible to pinpoint and often correct problems caused by installation errors, radio interference, power outages, etc., without dismantling the unit.

Furthermore, using NFC communication for lighting units, particularly streetlighting units, no physical connection to the unit is necessary to interact with its internal functions and memory. In addition, according to some examples, there is no requirement to isolate the mains voltage in order to communicate with the lighting unit by using NFC communications. In addition, using NFC communications also facilitates safer use and interaction with the lighting unit, particularly at height. Moreover, in some examples, it is advantageous to use NFC communication to interact with the lighting unit, particularly a streetlighting unit, in situations when its primary communication means is not working, e.g. over-the-air (OTA) wireless communications (for example low power wide area wireless (LPWA) or cellular wireless) or wireline.

Figure 3:
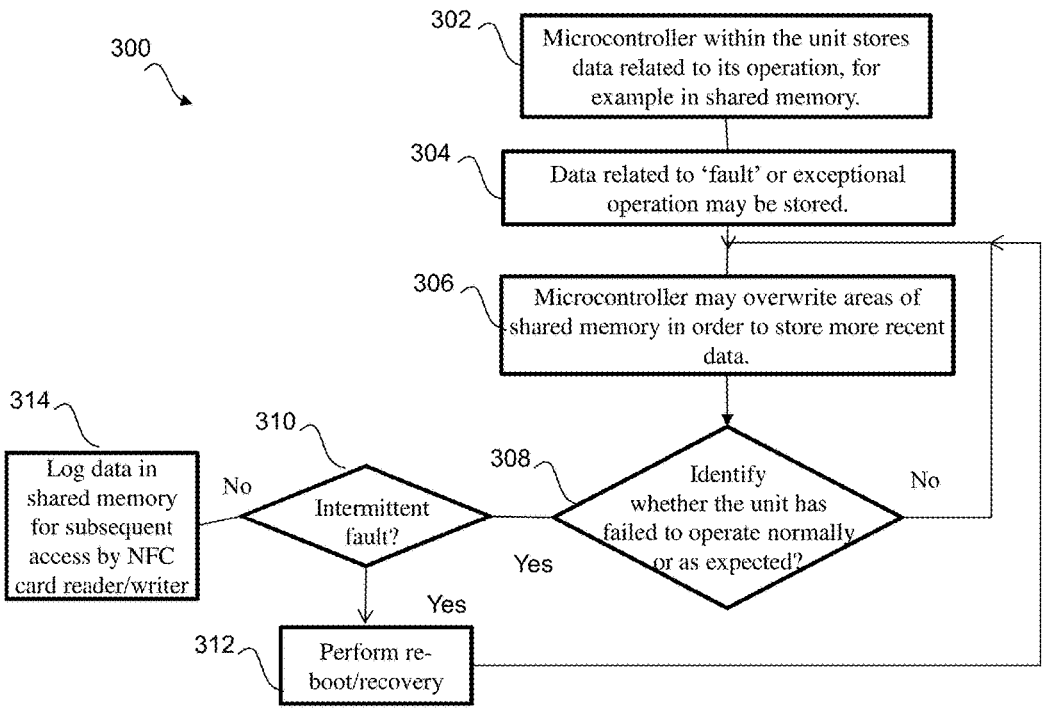
FIG. 3 illustrates a first example flowchart for identifying a fault in a lighting unit using NFC, such as the lighting unit of FIG. 2, according to the first example embodiment of the present invention.

FIG. 3 illustrates a first example flowchart 300 for identifying a fault in the lighting unit using NFC, according to a first example embodiment of the present invention. In the first example flowchart 300, a microcontroller within the unit, e.g. the lighting unit, stores data related to its operation, for example in shared memory, as shown in 302. In some examples, the use of the memory may be shared between a microcontroller within the unit and NFC-capable devices, such as a NFC tag or NFC card reader/writer, brought into close proximity with the unit. In some examples, data related to 'fault' or exceptional operation may be stored, as in 304. In some examples, the microcontroller may overwrite areas of shared memory in order to store more recent data, as in 306.

In 308, a determination is made as to whether the unit has failed to operate normally or as expected. If the unit has not failed to operate normally or as expected, the process loops back to 306 in this example. However, if the unit has failed to operate normally or as expected in 308, the process moves to 310 where a determination is made as to whether or not the fault is intermittent. If the fault is identified or believed to be intermittent, then a re-boot/recovery operation is performed in 312 and the process loops to 306. In this manner, it is hoped that the re-boot operation may correct the fault. However, if the fault is not deemed to be intermittent in 310, for example following a re-boot operation not having corrected the fault, then data on the lighting unit is logged in shared memory for subsequent access by an external NFC card reader/writer, as in 314.

The inventors have recognised that an ability to identify faults in lighting units using NFC may solve a number of current problems, particularly a number of problems identified in the field with streetlighting units, such as ergonomic or environmental or location problems in accessing the lighting unit. For example, using NFC to access the internal components, e.g. microcontroller 222 (or microprocessor) or memory 220 in lighting unit 210, enables caseworks to be manufactured and used that better protect the internal components, e.g. from water ingress. In addition, having better caseworks and/or not requiring that they be opened or removed to provide access for maintenance or programming or test purposes, protects the installation or testing technician from the mains voltage applied to the lighting unit. Additionally, if power to the lighting unit has been cut-off, NFC may be used to access data from memory located within the lighting unit. Furthermore, the ability to extract an ID of a lighting unit and/or other data via NFC and then optionally download software appropriate for the device with that ID, also using NFC, removes a problem with incomplete or damaged labelling on the lighting unit casework.

Figure 4:
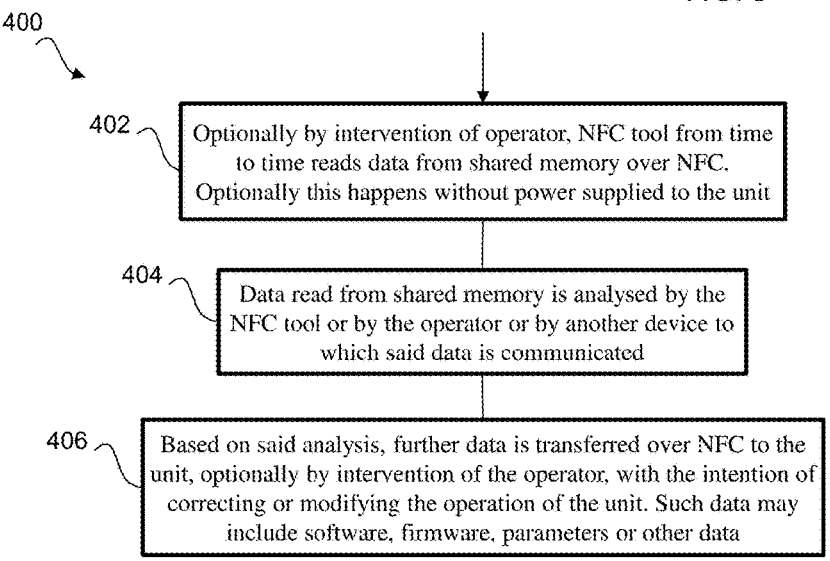
FIG. 4 illustrates a second example flowchart for identifying a fault in the lighting unit and/or correcting the identified fault using NFC, according to a second example embodiment of the present invention.

FIG. 4 illustrates a second example flowchart 400 for identifying a fault in the lighting unit and/or correcting the identified fault using NFC, according to a second example embodiment of the present invention. The second example flowchart 400 may be performed by an external NFC card reader/writer, and, say, follow step 314 of FIG. 3 in some examples. At 402, and optionally performed following an intervention by a technical operator, a NFC tool having NFC card reader/writer capabilities may be brought into the vicinity of the lighting unit in order to read data from the shared memory over NFC. Such an operation may be optionally performed on an ad hoc basis or from time to time on a more regular schedule. In some examples, the reading of data from the shared memory over NFC by the NFC tool having NFC card reader/writer capabilities may, in some examples, be performed without power being supplied to the lighting unit or the NFC tool.

In some examples, the data read from shared memory may be analysed in 404 on-site by the NFC tool, or in other examples by the operator, or in yet further examples by another device to which said data is subsequently communicated.

Based on the analysis in 404, further data may be transferred over NFC to the lighting unit in 406. The analysis may be performed when the lighting unit is functional (and in situ) or when the lighting unit is removed from its location, e.g. for some testing purpose. In some examples, such data transfer to the lighting unit, may be performed following intervention by the operator, with the intention of correcting or modifying the operation of the lighting unit. Such data may include software, firmware, parameters or other data to return the lighting unit to normal operation or to provide bug fixes or improved performance.

Figure 5:
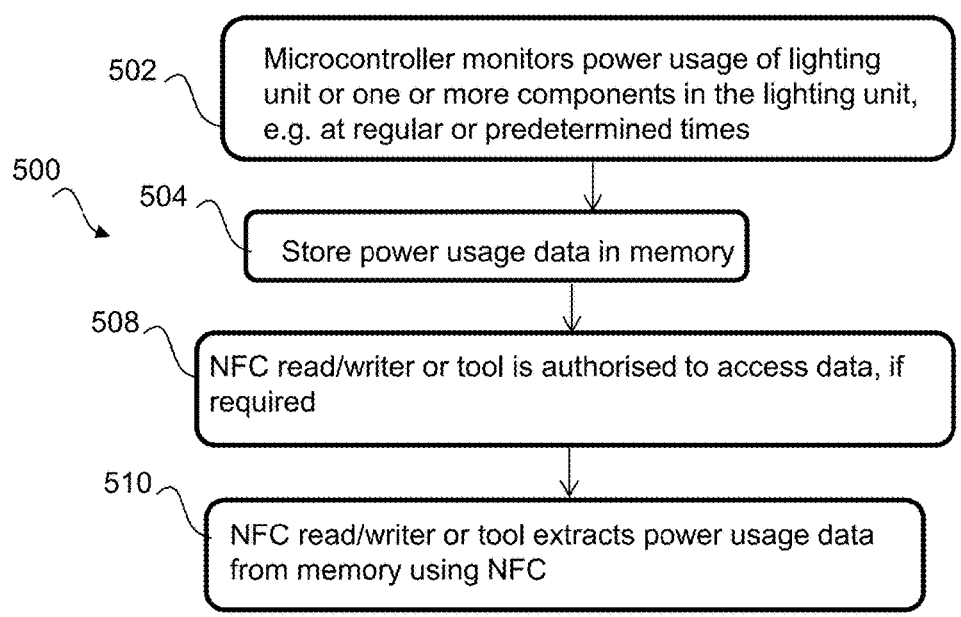
FIG. 5 illustrates a third example flowchart for providing power usage/metering information in a lighting unit using NFC, according to a third example embodiment of the present invention.

Referring now to FIG. 5 a third example flowchart 500 for providing metering information, such as power usage metering, for a lighting unit or one or more components within the lighting unit, using NFC, is illustrated according to a third example embodiment of the present invention. Within the lighting unit, such as a streetlighting unit, the microcontroller monitors a power usage of lighting unit or one or more components in the lighting unit, e.g. at regular or predetermined times, in 502. For example, this may be performed by, say, the metering circuit 240 in FIG. 2, and/or logic or software functionality may be configured to measure power delivered to the light 228 or one or more components in the lighting unit from a power supply 219. In some examples, such power usage may be monitored at the point at which main power enters the lighting unit 210, or by, say, metering a low voltage DC power supply in the unit, that doesn't necessarily power the light 228 itself.

At 504, the microcontroller stores power usage data in memory. The NFC reader/writer or NFC tool may move within range of the lighting unit, or already be within range of the lighting unit, for example in a metering testing situation. In some examples, the NFC reader/writer or NFC tool may need to be validated to access the memory, in 508. At 510, the NFC reader/writer or NFC tool then extracts power usage data from the memory using NFC. In this manner, measured power usage is accessible by the external NFC reader/writer for use in, say, a billing system and/or in a testing operation of the lighting unit or one or more components in the lighting unit and/or in a calibration of the metering function.

In the foregoing specification, an invention has been described with reference to specific illustrated examples. It will, however, be evident that various modifications and changes may be made therein without departing from the scope of the invention as set forth in the appended claims.

The connections as discussed herein may be any type of connections suitable to transfer signals from or to the respective nodes, units or devices, for example via intermediary components. Accordingly, unless implied or stated otherwise, the connections may for example be direct connections or indirect connections. The connections may be illustrated or described in reference to being a single connection, a plurality of connections, unidirectional connections or bidirectional connections. However, different illustrated examples may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Any arrangement of components to achieve the same functionality is effectively 'associated such that the desired functionality is achieved. Hence, any two components herein combined to achieve a particular functionality can be 'associated with' each other such that the desired functionality is achieved, irrespective of architectures or intermediary components. Likewise, two components so associated can also be viewed as being 'operably connected', or 'operably coupled' to each other to achieve the desired functionality.

Furthermore, those skilled in the art will recognise that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Furthermore, the illustrated examples may be implemented as circuitry located in a single integrated circuit or within the same device. Alternatively, the illustrated examples may be implemented as any number of separate integrated circuits or separate devices interconnected with each other in a suitable manner. However, other modifications, variations and alternatives are also possible. The specifications and drawings are, accordingly, to be regarded in an illustrative rather than in a restrictive sense.

It will be appreciated that, for clarity purposes, the above description has described embodiments of the invention with reference to different functional units and processors. However, it will be apparent that any suitable distribution of functionality between different functional units or processors, for example with respect to the equalizers, detectors, cyclic redundancy check circuits or components, etc., may be used without detracting from the invention. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved lighting unit (or set of lighting units), integrated circuit, and method for fault detection, fault diagnosis and/or improving a performance of a lighting unit have been described, by facilitating near field communications (NFC), wherein the aforementioned disadvantages with prior art arrangements have been substantially alleviated.

We claim:

1. A lighting unit comprising:
   a microcontroller; and
   a near field communication, NFC, -enabled embedded device comprising shared NFC memory configured to:
      be written to and read from by both an external NFC reader/writer using near field communication and the microcontroller, wherein the microcontroller is configured to store operational data for the lighting unit in the shared NFC memory, and the shared NFC memory is configured to receive and store correction software provided by the external NFC reader/writer in response to accessed operational data; and
      enable an operation of the lighting unit to be both monitored and controlled using NFC;
   wherein the microcontroller is configured to receive a notification that correction software has been uploaded to the shared NFC memory and access the correction software to perform at least one of the following:
      (i) correct a fault identified on the lighting unit based on the accessed operational data;
      (ii) update software on the lighting unit based on a software version employed by the microcontroller for operating the lighting unit.

2. The lighting unit according to claim 1 wherein the lighting unit is included in a low power wide area network of lighting units.

3. The lighting unit according to claim 2 wherein the lighting unit is an external streetlighting unit.

4. The lighting unit according to claim 3 wherein the external streetlighting unit is one from a group of substantially identical streetlighting units identified by a version identifier of the lighting unit and without an individual unit identifier.

5. The lighting unit according to claim 1 wherein in response to correction software being provided by the external NFC reader/writer the microcontroller is configured to re-program an operation of the lighting unit.

6. The lighting unit according to claim 5 wherein the NFC-enabled embedded device is configured to detect a presence of the external NFC reader/writer and provide a presence indication signal to the microcontroller, and in response to correction software being provided by the external NFC reader/writer the microcontroller is configured to re-program an operation of the lighting unit.

7. The lighting unit according to claim 1 wherein the microcontroller comprises or is coupled to a metering circuit configured to measure a power usage for the lighting unit and store the measured power usage in the shared NFC memory.

8. The lighting unit according to claim 7 wherein the stored power usage for the lighting unit is accessible by the external NFC reader/writer for use in at least one of: a billing system, in a lighting unit testing or lighting unit component testing operation, in calibration of a metering function.

9. The lighting unit according to claim 1 wherein the NFC-enabled embedded device is written to or read from by the external NFC reader/writer using near field communication in situ or when removed and separate from the lighting unit.

10. The lighting unit according to claim 1 wherein the NFC shared memory is configured to store at least:
an identifier of the lighting unit; and
a location of the lighting unit such that the at least one remote NFC reader/writer is capable to harvest the identifier and location of the lighting unit using an NFC communication link and upload to a microcontroller of a system.

11. The lighting unit according to claim 1 wherein the microcontroller is configured to manage a communication protocol to facilitate communications between NFC-enabled devices comprising at least one of the following: messages carry address information, enable subsequent forwarding of a message to an indicated destination address, messages provide an indication of an origin address, enable a message to transit more than one NFC-based connection perform, NFC error-detection, NFC error-correction, a message validity check.

12. The lighting unit according to claim 1 wherein the NFC shared memory is configured to store at least one or more of the following, accessible via NFC: a lighting unit identifier (ID), a date of manufacture, hardware or software version product options, status information, timing information, location information, configuration information, details of a state of one or more interface to the lighting unit.

13. An integrated circuit for a lighting unit comprising:
a microcontroller; and
a near field communication, NFC, -enabled embedded device comprising shared NFC memory configured to:
be written to by both an external NFC reader/writer using near field communication and the microcontroller to control an operation of the lighting unit, wherein the microcontroller is configured to store operational data for the lighting unit in the shared NFC memory, and the shared NFC memory is configured to receive and store correction software provided by the external NFC reader/writer in response to accessed operational data;
wherein the microcontroller is configured to receive a notification that correction software has been uploaded to the shared NFC memory and access the correction software to perform at least one of the following:
(i) correct a fault identified on the lighting unit based on the accessed operational data;
(ii) update software on the lighting unit based on a software version employed by the microcontroller for operating the lighting unit.

14. A method for controlling an operation of a lighting unit that comprises a microcontroller; and a near field communication, NFC, -enabled embedded device comprising NFC shared memory, the method comprising:
configuring the NFC shared memory to be written to and read from by both the microcontroller and an external NFC reader/writer using near field communication;
writing operational data of the lighting unit to the NFC shared memory by the microcontroller;
reading the operational data of the lighting unit from the NFC shared memory by the external NFC reader/writer using near field communication;
writing correction software to the NFC shared memory by the external NFC reader/writer based on data read from the NFC shared memory; and
accessing the correction software by the microcontroller to perform at least one of the following:
(i) correct a fault identified on the lighting unit based on the accessed operational data;
(ii) update software on the lighting unit based on a software version employed by the microcontroller for operating the lighting unit.

15. The method of claim 14 further comprising:
measuring a power usage for the lighting unit; and
storing the measured power usage in the shared NFC memory so that the measured power usage is accessible by the external NFC reader/writer for use in a billing system and/or in testing and/or calibration of the metering function.

16. A near field communication, NFC, system comprising:
an external near field communication, NFC, reader/writer;
a lighting unit comprising:
a microcontroller; and
a NFC-enabled embedded device comprising shared NFC memory configured to be written to and read from by both the external NFC reader/writer and the microcontroller to control an operation of the lighting unit, wherein the microcontroller is configured to store operational data for the lighting unit in the shared NFC memory, and the shared NFC memory is configured to receive and store correction software provided by the external NFC reader/writer in response to accessed operational data;
wherein the microcontroller is configured to receive a notification that correction software has been uploaded to the shared NFC memory and access the correction software to perform at least one of the following:
(i) correct a fault identified on the lighting unit based on the accessed operational data;
(ii) update software on the lighting unit based on a software version employed by the microcontroller for operating the lighting unit.

17. The NFC system according to claim 16 wherein the lighting unit is an external streetlighting unit.

18. The NFC system according to claim 17 wherein the external streetlighting unit is one from a group of substantially identical streetlighting units identified by a version identifier of the lighting unit and without an individual unit identifier.

19. The NFC system according to claim 16 wherein, in response to a detection of a presence of the external NFC reader/writer the microcontroller is configured to turn on power to the NFC-enabled embedded device.

* * * * *